US006564051B2

(12) United States Patent
Struhsaker et al.

(10) Patent No.: US 6,564,051 B2
(45) Date of Patent: May 13, 2003

(54) SYSTEM AND METHOD FOR INTERFACE BETWEEN A SUBSCRIBER MODEM AND SUBSCRIBER PREMISES INTERFACES

(75) Inventors: Paul F. Struhsaker, Plano, TX (US); Rex N. Frodge, McKinney, TX (US); Barry W. Barge, Richardson, TX (US)

(73) Assignee: Raze Technoliges, Inc., Plano, TX (US)

( * ) Notice: Subject to any disclaimer, the term of this patent is extended or adjusted under 35 U.S.C. 154(b) by 0 days.

(21) Appl. No.: 09/838,910

(22) Filed: Apr. 20, 2001

(65) Prior Publication Data

US 2002/0090962 A1 Jul. 11, 2002

Related U.S. Application Data

(60) Provisional application No. 60/262,826, filed on Jan. 19, 2001, provisional application No. 60/626,712, filed on Jan. 19, 2001, provisional application No. 60/262,825, filed on Jan. 19, 2001, provisional application No. 60/262,698, filed on Jan. 19, 2001, provisional application No. 60/262,827, filed on Jan. 19, 2001, provisional application No. 60/262,951, filed on Jan. 19, 2001, provisional application No. 60/262,824, filed on Jan. 19, 2001, provisional application No. 60/263,101, filed on Jan. 19, 2001, provisional application No. 60/263,097, filed on Jan. 19, 2001, provisional application No. 60/273,579, filed on Mar. 5, 2001, provisional application No. 60/262,955, filed on Jan. 19, 2001, provisional application No. 60/262,708, filed on Jan. 19, 2001, provisional application No. 60/273,689, filed on Mar. 5, 2001, provisional application No. 60/273,757, filed on Mar. 5, 2001, provisional application No. 60/270,378, filed on Feb. 21, 2001, provisional application No. 60/270,385, filed on Feb. 21, 2001, and provisional application No. 60/270,430, filed on Feb. 21, 2001.

(51) Int. Cl.[7] ................................................. H04Q 7/20
(52) U.S. Cl. ........................ 455/423; 455/67.1; 455/572
(58) Field of Search .................................. 455/423, 424, 455/425, 426, 522, 67.1, 67.3, 557, 572, 573, 574

(56) References Cited

U.S. PATENT DOCUMENTS 5,566,339 A * 10/1996 Perholtz et al. ............... 379/38
5,638,371 A    6/1997 Raychaudhuri et al. ...... 370/347
5,661,463 A * 8/1997 Letchak et al. ............... 340/636
5,684,791 A   11/1997 Raychaudhuri et al. ...... 370/278
5,694,424 A   12/1997 Ariyavisitakul .............. 375/233
5,729,197 A * 3/1998 Cash ........................... 455/331
5,809,086 A    9/1998 Ariyavisitakul .............. 375/332
5,960,344 A * 9/1999 Mahany ....................... 455/432
5,982,854 A   11/1999 Ehreth ........................ 379/56.2
5,991,292 A   11/1999 Focsaneanu et al. ......... 370/352
6,029,092 A * 2/2000 Stein ........................... 700/11
6,188,873 B1   2/2001 Wickman et al. ........... 455/11.1

FOREIGN PATENT DOCUMENTS

| WO | WO 99/31752 | 6/1999 |
| WO | WO 99/39541 | 8/1999 |

OTHER PUBLICATIONS

Osifchin N: "Power Considerations for the Modernization of Telecommunications Central and Eastern European and Former Soviet Union (CEE/FSU) Countries" Conference proceedings article, XP010268191, p. 15, column 1, line 47 –page 16, column 1, line 28.

* cited by examiner

Primary Examiner—Thanh Cong Le
Assistant Examiner—Thuan T. Nguyen

(57) ABSTRACT

There is disclosed an apparatus for interconnecting a plurality of communications mediums, including voice frequency and broadband frequency to a subscriber communications system at the subscriber's premises. The apparatus comprises: 1) a controller for coupling and de-coupling communications mediums comprising at least one public service telephone network (PSTN) line and at least one non-public service telephone network (non-PSTN) line, to a communication system within the subscriber's premises; 2) lightning protection for controller interfaces; 3) a detector circuit for detecting power loss in the non-public service telephone network connection and 4) fail-over (re-connecting to an alternate circuit) devices connected to a public service telephone network line; and 5) a test circuit for monitoring the condition of a backup power supply for the apparatus.

20 Claims, 11 Drawing Sheets

SYSTEM AND METHOD FOR INTERFACE BETWEEN A SUBSCRIBER MODEM AND SUBSCRIBER PREMISES INTERFACES

The present invention claims priority to U.S. Provisional Application Serial No. 60/262,826 filed Jan. 19, 2001.

CROSS-REFERENCE TO RELATED APPLICATIONS

The present invention is related to those disclosed in the following U.S. Provisional and Non-Provisional Patent Applications:

1. Ser. No. 09/713;684, filed on Nov. 15, 2000, entitled "SUBSCRIBER INTEGRATED ACCESS DEVICE FOR USE IN WIRELESS AND WIRELINE ACCESS SYSTEMS";

2. Ser. No. 09/838,810, filed Apr. 20, 2001, entitled "WIRELESS COMMUNICATION SYSTEM USING BLOCK FILTERING AND FAST EQUALIZATION-DEMODULATION AND METHOD OF OPERATION";

3. Ser. No. 09/839,726, filed Apr. 20, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";

4. Ser. No. 09/839,729, filed Apr. 20, 2001, entitled "APPARATUS AND METHOD FOR OPERATING A SUBSCRIBER INTERFACE IN A FIXED WIRELESS SYSTEM";

5. Ser. No. 09/839,719, filed Apr. 20, 2001, entitled "APPARATUS AND METHOD FOR CREATING SIGNAL AND PROFILES AT A RECEIVING STATION";

6. Ser. No. 09/839,509, filed Apr. 20, 2001, entitled "BACKPLANE ARCHITECTURE FOR USE IN WIRELESS AND WIRELINE ACCESS SYSTEMS";

7. Ser. No. 09/839,514, filed Apr. 20,2001, entitled "SYSTEM AND METHOD FOR ON-LINE INSERTION OF LINE REPLACEABLE UNITS IN WIRELESS AND WIRELINE ACCESS SYSTEMS";

8. Ser. No. 09/839,512, filed Apr. 20, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";

9. Ser. No. 09/839,259, filed Apr. 20, 2001, entitled "REDUNDANT TELECOMMUNICATION SYSTEM USING MEMORY EQUALIZATION APPARATUS AND METHOD OF OPERATION";

10. Ser. No. 09/839,457, filed Apr. 20, 2001, entitled "WIRELESS ACCESS SYSTEM FOR ALLOCATING AND SYNCHRONIZING UPLINK AND DOWNLINK OF TDD FRAMES AND METHOD OF OPERATION";

11. Ser. No. 09/839,075, filed Apr. 20, 2001, entitled "TDD FDD AIR INTERFACE";

12. Ser. No. 09/839,499, filed Apr. 20, 2001, entitled "APPARATUS, AND AN ASSOCIATED METHOD, FOR PROVIDING WLAN SERVICE IN A FIXED WIRELESS ACCESS COMMUNICATION SYSTEM";

13. Ser. No. 09/839,458, filed Apr. 20, 2001, entitled "WIRELESS ACCESS SYSTEM USING MULTIPLE MODULATION";

14. Ser. No. 09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";

15. Ser. No. 09/838,924, filed Apr. 20, 2001, entitled "APPARATUS FOR ESTABLISHING A PRIORITY CALL IN A FIXED WIRELESS ACCESS COMMUNICATION SYSTEM";

16. Ser. No. 09/839,727, filed Apr. 20, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM";

17. Ser. No. 09/839,734, filed Apr. 20, 2001, entitled "METHOD FOR ESTABLISHING A PRIORITY CALL IN A FIXED WIRELESS ACCESS COMMUNICATION SYSTEM";

18. Ser. No. 09/839,513, filed Apr. 20, 2001, entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS";

19. Ser. No. 60/262,712, filed on Jan. 19, 2001, entitled "WIRELESS COMMUNICATION SYSTEM USING BLOCK FILTERING AND FAST EQUALIZATION-DEMODULATION AND METHOD OF OPERATION";

20. Ser. No. 60/262,825, filed on Jan. 19, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";

21. Ser. No. 60/262,698, filed on Jan. 19, 2001, entitled "APPARATUS AND METHOD FOR OPERATING A SUBSCRIBER INTERFACE IN A FIXED WIRELESS SYSTEM";

22. Ser. No. 60/262,827, filed on Jan. 19, 2001, entitled "APPARATUS AND METHOD FOR CREATING SIGNAL AND PROFILES AT A RECEIVING STATION";

23. Ser. No. 60/262,951, filed on Jan. 19, 2001, entitled "BACKPLANE ARCHITECTURE FOR USE IN WIRELESS AND WIRELINE ACCESS SYSTEMS";

24. Ser. No. 60/262,824, filed on Jan. 19, 2001, entitled "SYSTEM AND METHOD FOR ON-LINE INSERTION OF LINE REPLACEABLE UNITS IN WIRELESS AND WIRELINE ACCESS SYSTEMS";

25. Ser. No. 60/263,101, filed on Jan. 19, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";

26. Ser. No. 60/263,097, filed on Jan. 19, 2001, entitled "REDUNDANT TELECOMMUNICATION SYSTEM USING MEMORY EQUALIZATION APPARATUS AND METHOD OF OPERATION";

27. Ser. No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";

28. Ser. No. 60/262,955, filed Jan. 19, 2001, entitled "TDD FDD AIR INTERFACE";

29. Ser. No. 60/262,708, filed on Jan. 19, 2001, entitled "APPARATUS, AND AN ASSOCIATED METHOD, FOR PROVIDING WLAN SERVICE IN A FIXED WIRELESS ACCESS COMMUNICATION SYSTEM";

30. Ser. No. 60/273,689, filed Mar. 5, 2001, entitled "WIRELESS ACCESS SYSTEM USING MULTIPLE MODULATION";

31. Ser. No. 60/273,757, filed Mar. 5, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";

32. Ser. No. 60/270,378, filed Feb. 21, 2001, entitled "APPARATUS FOR ESTABLISHING A PRIORITY CALL IN A FIXED WIRELESS ACCESS COMMUNICATION SYSTEM";

33. Ser. No. 60/270,385, filed Feb. 21, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM"; and 34. Ser. No. 60/270,430, filed Feb. 21, 2001, entitled "METHOD FOR ESTABLISHING A PRIORITY CALL IN A FIXED WIRELESS ACCESS COMMUNICATION SYSTEM".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to broadband communications and, more specifically, to a system for integrating packet and circuit switched networks at a subscriber's premises.

BACKGROUND OF THE INVENTION

Telecommunications access systems provide for voice, data, and multimedia transport and control between the central office (CO) of the telecommunications service provider and the subscriber (customer of the service provider) premises. Prior to the mid-1970s, the subscriber was provided phone lines (e.g., voice frequency (VF) pairs) directly from the Class 5 switching equipment located in the central office of the telephone company. In the late 1970s, digital loop carrier (DLC) equipment was added to the telecommunications access architecture. The DLC equipment provided an analog phone interface, voice CODEC, digital data multiplexing, transmission interface, and control and alarm remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g., T1/T3 lines in North America, E1/E3 lines in Europe). ISDN was a logical extension of the digital network that had evolved throughout the 1980s. The rollout of ISDN in Europe was highly successful. However, the rollout in the United States was not successful, due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace. To meet these demands, high speed DSL (digital subscriber line) modems and cable modems have been developed and introduced. The DLC architecture was extended to provide remote distributed deployment at the neighborhood cabinet level using DSL access multiplexer (DSLAM) equipment. The increased data rates provided to the subscriber resulted in upgrade DLC/DSLAM transmission interfaces from T1/E1 interfaces (1.5/2.0 Mbps) to high speed DS3 and OC3 interfaces. In a similar fashion, the entire telecommunications network backbone has undergone and is undergoing continuous upgrade to wideband optical transmission and switching equipment.

Similarly, wireless access systems have been developed and deployed to provide broadband access to both commercial and residential subscriber premises. Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) systems deployment from rural access to competitive local access in more urbanized areas. In addition, the age and inaccessibility of much of the older wired telephone infrastructure makes FWA systems a cost-effective alternative to installing new, wired infrastructure. Also, it is more economically feasible to install FWA systems in developing countries where the market penetration is limited (i.e., the number and density of users who can afford to pay for services is limited to small percent of the population) and the rollout of wired infrastructure cannot be performed profitably. In either case, broad acceptance of FWA systems requires that the voice and data quality of FWA systems must meet or exceed the performance of wired infrastructure.

Wireless access systems must address a number of unique operational and technical issues including:

1) Relatively high bit error rates (BER) compared to wire line or optical systems; and
2) Transparent operation with network protocols and protocol time constraints for the following protocols:
   a) ATM;
   b) Class 5 switch interfaces (domestic GR-303 and international V5.2);
   c) TCP/IP with quality-of-service QoS for voice over IP (VoIP) (i.e., RTP) and other H.323 media services;
   d) Distribution of synchronization of network time out to the subscribers;
3) Increased use of voice, video and/or media compression and concentration of active traffic over an air interface to conserve bandwidth;
4) Switching and routing within the access system to distribute signals from the central office to multiple remote cell sites containing multiple cell sectors and one or more frequencies of operation per sector; and
5) Remote support and debugging of the subscriber equipment, including remote software upgrade and provisioning.

Unlike physical optical or wire systems that operate at bit error rates (BER) of $10^{-11}$, wireless access systems have time varying channels that typically provide bit error rates of $10^{-3}$ to $10^{-6}$. The wireless physical (PHY) layer interface and the media access control (MAC) layer interface must provide modulation, error correction and ARQ protocol that can detect and, where required, correct or retransmit corrupted data so that the interfaces at the network and at the subscriber site operate at wire line bit error rates.

The wide range of equipment and technology capable of providing either wireline (i.e., cable, DSL, optical) broadband access or wireless broadband access has allowed service providers to match the needs of a subscriber with a suitable broadband access solution. However, in many areas, the cost of cable modem or DSL service is high. Additionally, data rates may be slow or coverage incomplete due to line lengths. In these areas and in areas where the high cost of replacing old telephone equipment or the low density of subscribers makes it economically unfeasible to introduce either DSL or cable modem broadband access, fixed wireless broadband systems offer a viable alternative. Fixed wireless broadband systems use a group of transceiver base stations to cover a region in the same manner as the base stations of a cellular phone system. The base stations of a fixed wireless broadband system transmit forward channel (i.e., downstream) signals in directed beams to fixed location antennas attached to the residences or offices of subscribers. The base stations also receive reverse channel (i.e., upstream) signals transmitted by the broadband access equipment of the subscriber.

Unfortunately, the diversity of broadband access technology has resulted in a lack of standardization in the broadband access equipment. Cable modems and DSL routers are incompatible with each other and with fiber optic equipment. Different service providers locate broadband access equipment in different locations on the subscriber premises. Often this equipment is located inside the office or residence of the subscriber, which makes it inaccessible to maintenance workers unless the subscriber is present to admit the workers to the premises. The lack of standardization of broadband access equipment and the frequent inaccessibility of such equipment adds to the cost and complexity of broadband access.

Therefore, there is a need in the art for broadband access equipment that can be readily and inexpensively deployed in the large domestic and international markets that are not currently served by wired or wireless broadband access technology. In particular, there is a need for broadband access equipment that provides competitive local exchange carriers (CLECs) a highly cost-effective turnkey facility solution that significantly improves profit margins and service quality. More particularly, there is a need for a subscriber integrated access device that may be easily and inexpensively installed and accessed at the subscriber's premises and that is compatible with different types of wireline and wireless broadband access technologies.

SUMMARY OF THE INVENTION

To address the above-discussed deficiencies of the prior art, it is a primary object of the present invention to provide, for use with a subscriber interface access device for a communication network, an apparatus for interconnecting a plurality of communications mediums including voice frequency and broadband frequency, to the subscriber's communication system. According to an advantageous embodiment of the present invention, the apparatus comprises: 1) a controller for coupling and de-coupling communications mediums, that comprise at least one public service telephone network (PSTN) connection and at least one non-public service telephone network (non-PSTN) connection, to a communication system within the subscriber's premises; 2) lightning protection for the interfaces that are provided for the controller; 3) a detector circuit for detecting power loss in the non-public service telephone network connection (e.g., wireless, broadband, optical fiber, and the like) and 4) fail-over (re-connecting to an alternate circuit) devices connected to at least one public service telephone network line; and 5) a test circuit for determining the condition of a backup power supply for said apparatus.

According to one embodiment of the present invention, the apparatus comprises interconnection with a radio frequency transceiver for transmitting and receiving wireless communications from a wireless network.

According to another embodiment of the present invention, the wireless network is a fixed wireless network.

According to still another embodiment of the present invention, the interconnect apparatus further comprises a broadband interface for transmitting and receiving broadband data communications including cable modem, digital subscriber line, fiber optic and wireless broadband.

According to yet another embodiment of the present invention, the interconnect apparatus further comprises a telemetry/control circuit for remote monitoring and troubleshooting of said backup power supply.

According to a further embodiment of the present invention, the interconnect apparatus further comprises relay devices interconnected between a primary PSTN line and all non-PSTN lines for fail-over connection from non-PSTN lines to the primary PSTN lines.

According to another embodiment of the present invention, the interconnect apparatus further comprises an interface for receiving a plurality of standard voice frequency communication lines.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged subscriber integrated access device.

Figure 1:
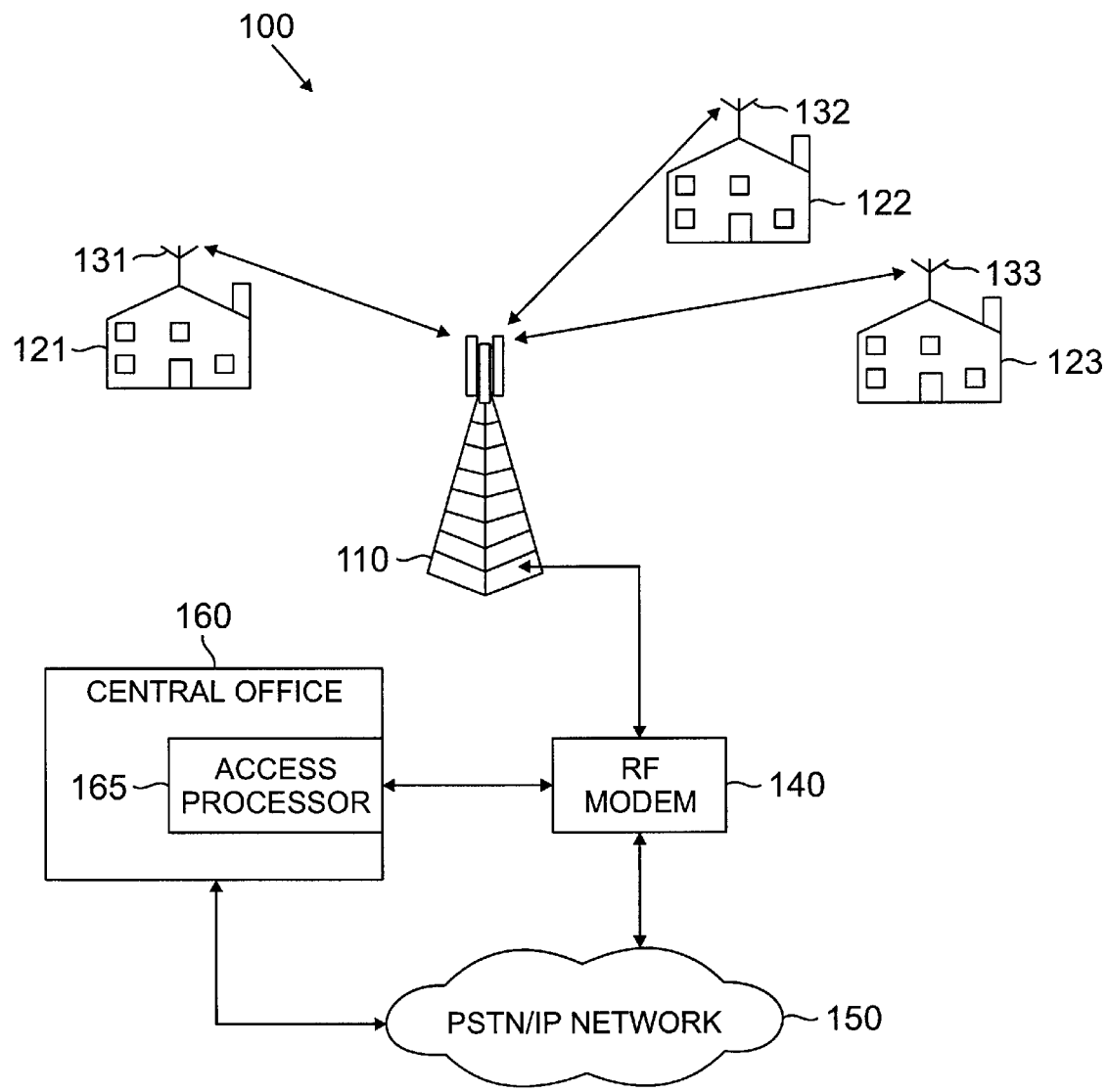
FIG. 1 illustrates an exemplary fixed wireless access network according to one embodiment of the present invention.

FIG. 1 illustrates exemplary fixed wireless access network 100 according to one embodiment of the present invention. Fixed wireless network 100 comprises a plurality of transceiver base stations, including exemplary transceiver base station 110, that transmit forward channel (i.e., downlink or downstream) broadband signals to a plurality of subscriber premises, including exemplary subscriber premises 121, 122 and 123, and receive reverse channel (i.e., uplink or upstream) broadband signals from the plurality of subscriber premises. Subscriber premises 121–123 transmit and receive via fixed, externally-mounted antennas 131–133, respectively. Subscriber premises 121–123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel (i.e., downlink) signals from external network 150 and transmit the reverse channel (i.e., uplink) signals to external network 150. External network 150 may be, for example, the public switched telephone network (PSTN) or one or more data networks, including the Internet or proprietary Internet protocol (IP) wide area networks (WANs) and local area networks (LANs). Exemplary transceiver base station 110 is coupled to RF modem shelf 140, which, among other things, up-converts baseband data traffic received from external network 150 to RF signals transmitted in the forward channel to subscriber premises 121–123. RF modem shelf 140 also down-converts RF signals received in the reverse channel from subscriber premises 121–123 to baseband data traffic that is transmitted to external network 150.

RF modem shelf 140 comprises a plurality of RF modems capable of modulating (i.e., up-converting) the baseband data traffic and demodulating (i.e., down-converting) the reverse channel RF signals. In an exemplary embodiment of the present invention, each of the transceiver base stations covers a cell site area that is divided into a plurality of sectors. In an advantageous embodiment of the present invention, each of the RF modems in RF modem shelf 140 may be assigned to modulate and demodulate signals in a particular sector of each cell site. By way of example, the cell site associated with transceiver base station 110 may be partitioned into six sectors and RF modem shelf 140 may comprise six primary RF modems (and, optionally, a seventh spare RF modem), each of which is assigned to one of the six sectors in the cell site of transceiver base station 110. In another advantageous embodiment of the present invention, each RF modem in RF modem shelf 140 comprises two or more RF modem transceivers which may be assigned to at least one of the sectors in the cell site. For example, the cell site associated with transceiver base station 110 may be partitioned into six sectors and RF modem shelf 140 may comprise twelve RF transceivers that are assigned in pairs to each one of the six sectors. The RF modems in each RF modem pair may alternate modulating and demodulating the downlink and uplink signals in each sector.

RF modem shelf 140 is located proximate transceiver base station 110 in order to minimize RF losses in communication line 169. RF modem shelf 140 may receive the baseband data traffic from external network 150 and transmit the baseband data traffic to external network 150 via a number of different paths. In one embodiment of the present invention, RF modem shelf 140 may transmit baseband data traffic to, and receive baseband data traffic from, external network 150 through central office facility 160 via communication lines 166 and 167. In such an embodiment, communication line 167 may be a link in a publicly owned or privately owned backhaul network. In another embodiment of the present invention, Rf modem shelf 140 may transmit baseband data traffic to, and receive baseband data traffic from, external network 150 directly via communication line 168 thereby bypassing central office facility 160.

Central office facility 160 comprises access processor shelf 165. Access processor shelf 165 provides a termination of data traffic for one or more RF modem shelves, such as RF modem shelf 140. Access processor shelf 165 also provides termination to the network switched circuit interfaces and/or data packet interfaces of external network 150. One of the principal functions of access processor shelf 165 is to concentrate data traffic as the data traffic is received from external network 150 and is transferred to RF modem shelf 140. Access processor shelf 165 provides data and traffic processing of the physical layer interfaces, protocol conversion, protocol management, and programmable voice and data compression.

It should be noted that network 100 was chosen as a fixed wireless access network only for the purposes of simplicity and clarity in explaining a subscriber integrated access device according to the principles of the present invention. The choice of a fixed wireless network should not be construed in any manner that limits the scope of the present invention in any way. As will be explained below in greater detail, in alternate embodiments of the present invention, a subscriber integrated access device according to the principles of the present invention may be implemented in other types of broadband access systems, including wireline systems (i.e, digital subscriber line (DSL), cable modem, fiber optic, and the like) in which a wireline connected to the subscriber integrated access device carries forward and reverse channel signals.

Figure 2:
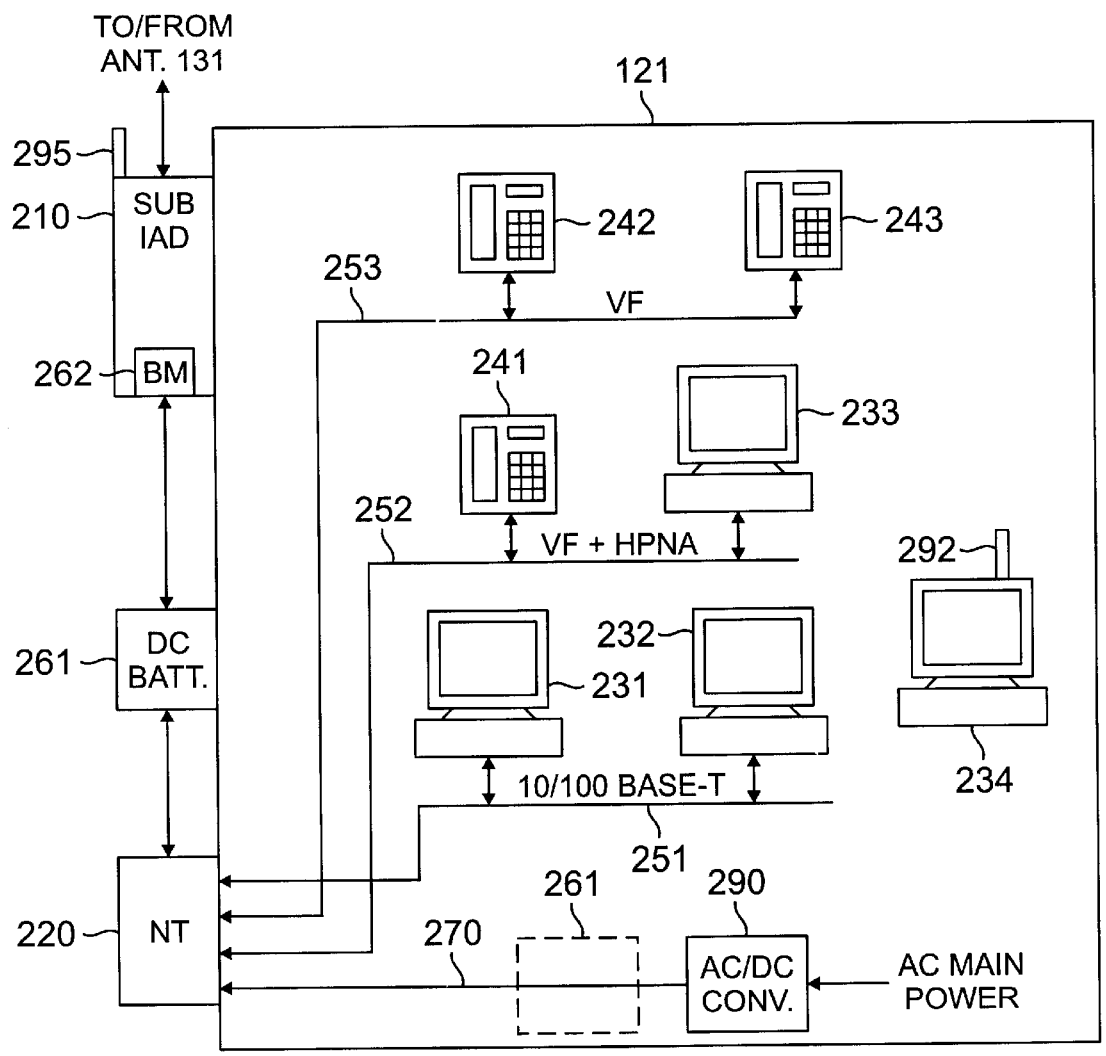
FIG. 2 illustrates exemplary subscriber premises in which subscriber integrated access device (IAD), according to the principles of the present invention, is installed.

FIG. 2 illustrates exemplary subscriber premises 121 in which subscriber integrated access device (IAD) 210 according to the principles of the present invention is implemented. Subscriber IAD 210 is connected to one or more communication devices in subscriber premises 121 via network termination (NT) 220 or (optionally) via a wireless local area network (LAN) connection. Subscriber premises 121 may contain one or more processing devices, such as exemplary personal computers 231, 232, 233 and 234, and one or more telephones, including exemplary telephones 241, 242 and 243, that are capable of communicating via the broadband access capability of fixed wireless access network 100.

NT 220 is the external point to which data lines and phone lines within a residence or office are brought in order to be connected to the local telephone service provider. AC/DC converter 290 converts the main AC power in subscriber premises 121 to primary DC power that powers subscriber IAD 210. In order to comply with government regulations for telephone service to one or more telephones in subscriber premises 121, DC battery 261 is charged from the DC output of AC/DC converter 290 in order to provide at least eight hours of backup power in case of a failure of the AC main power in subscriber premises 121. DC battery 261 also includes a temperature sensor (not shown), voltage measurement device (not shown) and lightning protection (not shown) for signal connections to the subscriber's premises (for detailed explanation see FIG. 5 and FIG. 8). Battery monitor (BM) 262 in subscriber IAD 210 detects main AC power failures and detects low power conditions on DC battery 261 and transmits alarms to fixed wireless access network 100 through subscriber IAD 210.

In an alternate embodiment of the present invention, DC battery 261 may be located inside subscriber premises 121 (as shown by dotted lines), rather than mounted on the outside of subscriber premises 121. However, in a preferred embodiment of the present invention, DC battery 261 is externally mounted in order to give maintenance personnel easy access to nearly all components of the subscriber access system (i.e., subscriber IAD 210, DC battery 261, antenna 131) without requiring the homeowner to be present. Although AC/DC converter 290 is disposed in subscriber premises 121, this does not present a problem. Conventional AC/DC converters have very large mean time between failure (MTBF) ratings, so that failures are rare. Furthermore, AC/DC converters are common, inexpensive commercial products that may be purchased and easily installed by the subscriber without the assistance of maintenance personnel. As will be described below in greater detail, since DC battery 261 is often mounted on the outside of subscriber premises 121, DC battery 261 can comprise an internal tamper alarm circuit that transmits an alarm to battery monitor 262 if DC battery 261 is opened or otherwise tampered with by someone other than maintenance personnel. A temperature sensor is also included so that DC battery 261 is only charged within a specific battery temperature range (i.e., 0 degrees to 40 degrees C.). An insulator covering is used in conjunction with a heater to allow charging in very cold weather.

Figure 3:
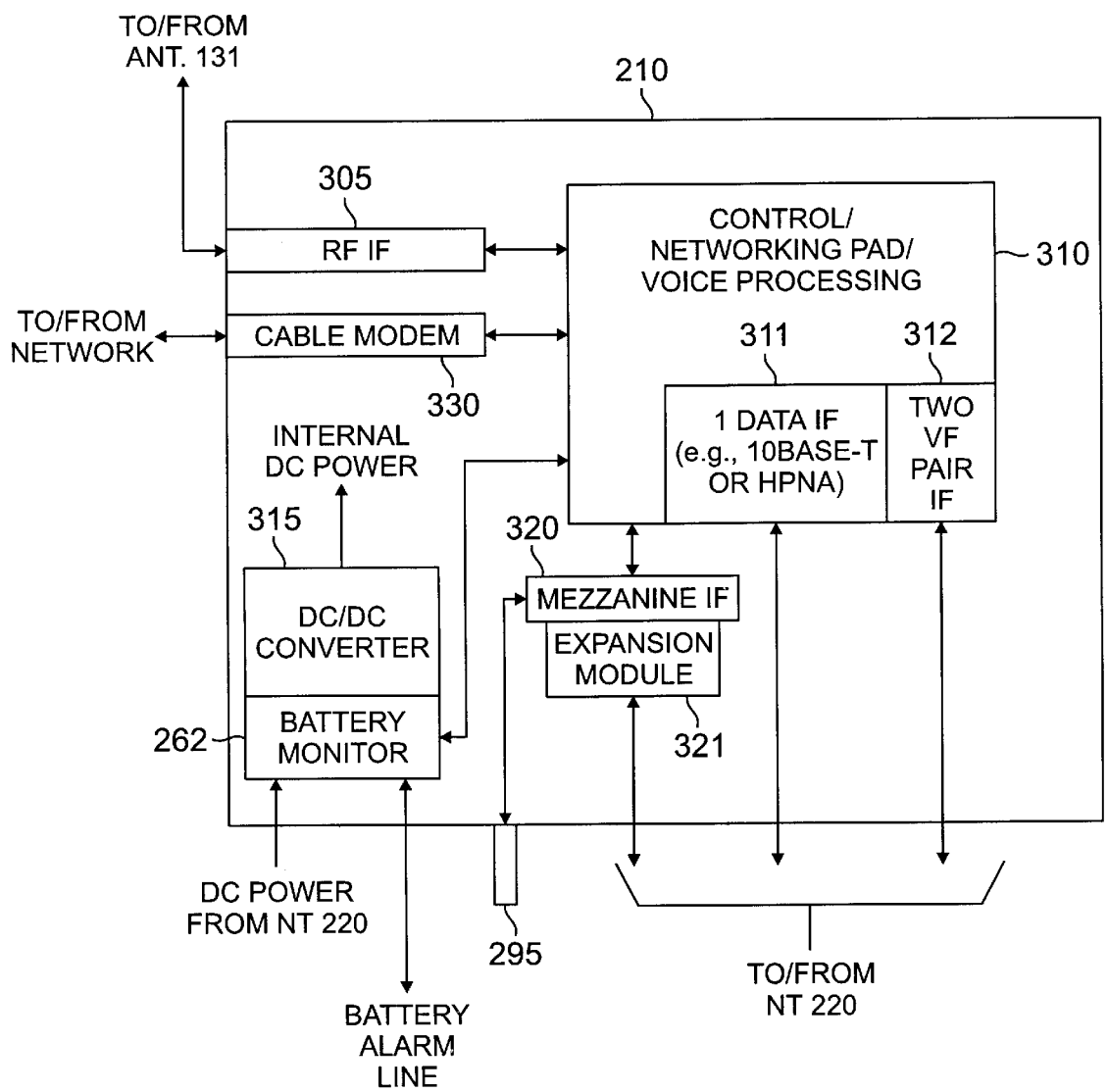
FIG. 3 depicts exemplary subscriber integrated access device (IAD) in greater detail according to one embodiment of the present invention.

FIG. 3 depicts exemplary subscriber integrated access device (IAD) 210 in greater detail according to one embodiment of the present invention. Subscriber IAD 210 is an external unit capable of, for example, radio frequency downconversion, protocol conversion, voice decompression and control functions. As noted above, the entire subscriber IAD system comprises three major elements:

1) external antenna 131 allows for multiple antenna options for increased gain or multiple element antenna subsystems to provide beamforming capabilities;

2) subscriber IAD 210 main assembly contains the integrated printed circuit board (PCB) motherboard and a mezzanine interface into which an optional expansion module may be inserted to provide, for example, two additional voice frequency (VF) pairs, a T1/E1 module, or a TE/E3 module for use in a SOHO premises, a small/medium enterprise (SME) premises, or a multitenant unit (MTU) premises; and 3) DC battery 261 and AC/DC converter 290, which may be deployed inside or (preferably) outside subscriber premises 121 to provide at least eight (8) hours of operation without AC main power.

Subscriber IAD 210 is connected directly to some subscriber premises equipment (i.e., PC 231–233, telephones 241–243) to provide direct access to voice and broadband data in fixed wireless access network 100 at the NT 220 demarcation point at the subscriber premise. Both product cost and life-cycle/installation costs are reduced by integrating voice and data interfaces into a single external unit that connects to the standard NT 220 interface at the subscriber premises. Optionally, subscriber IAD 210 may also communicate wirelessly with some subscriber premises equipment, such as PC 234, via a wireless LAN connection. As will be explained below, subscriber IAD 210 may wirelessly transmit data to and receive data from PC 234 via antenna 295. Similarly, PC 234 may wirelessly transmit data to and receive data from subscriber IAD 210 via antenna 292.

In an advantageous embodiment of the present invention, subscriber IAD 210 may provide at least four data interface options, including:

1) separate CAT-5 twisted pairs for 10 Base-T Ethernet;

2) one of the VF pairs may be used with, for example, a 1 Mbps or 10 Mbps Home Phone Network Alliance (HPNA) interface or other shared voice/data home wiring twisted pair system;

3) home power line interface with release of higher bandwidth implementations (>1 Mbps); and 4) wireless LAN connection to subscriber premises equipment.

In an advantageous embodiment, subscriber IAD 210 comprises RF interface (IF) 305, control/networking PAD/ voice processing circuitry 310, DC/DC converter 315, battery monitor 262, and mezzanine interface 320. In a fixed wireless embodiment, RF IF 305 provides modulation and demodulation of forward and reverse channel signals between transceiver base station 110 and subscriber IAD 210. DC/DC converter 315 converts the external DC power received from battery 261 to the necessary internal DC power levels used by the components of subscriber IAD 210. Battery monitor 262 monitors the battery power from DC battery 261 and receives alarm signals, if any, from DC battery 261.

If main AC power fails, or if DC battery 261 is tampered with, DC battery 261 transmits alarm signals to battery monitor 262. If the DC power level from DC battery falls too low after an AC power failure, battery monitor 262 detects the low DC power level condition and generates an alarm. The alarms generated by or received by battery monitor 262 are sent to control/networking PAD/voice processing circuitry 310 in order to be transmitted back to the fixed wireless service provider.

In a standard (and low cost) configuration, control/networking PAD/voice processing circuitry 310 comprises, among other things, two voice frequency (VF) pair interface (IF) 312 and data interface (IF) 325. Control/networking PAD/voice processing circuitry 310 performs the overall control functions of subscriber IAD 210 and converts reverse channel voice and data signals received from telephones 241–243 and PC 231–233 to the necessary protocols for transmission to transceiver base station 110 via RF IF 305. Similarly, control/networking PAD/voice processing circuitry 310 converts forward channel signals received from transceiver base station 110 via RF IF 305 to voice and data signals that are used by telephones 241–243 and PC 231–233.

In alternate wireline embodiments of the present invention, subscriber IAD 210 may also comprise an expansion slot for one or more wireline interfaces, including for example, cable modem 330. Alternative wireline interfaces may include an optical interface, a DSL router, or the like, in addition to, or in place of, RF IF 305. Cable modem 330 (or an optical interface or a DSL router) provide external interface connection points for a cable modem data line, a fiber optic line, and a DSL line, respectively.

As noted above, in an advantageous embodiment of the present invention, mezzanine IF 320 receives expansion module 321 in order to provide additional capabilities to subscriber IAD 210, particularly to meet the needs of small-medium business enterprises and multi-tenant units. For example, expansion module 321 may comprise a voice frequency pair interface, similar to two VF IF 312, providing subscriber IAD 210 with a total capability of four voice lines and one data line (4V/1D).

In a second embodiment, expansion module 321 may comprise a T1/E1 interface. In a third embodiment, expansion module 321 may comprise a T3/E3 interface. In a fourth embodiment, expansion module 321 may comprise a DSL or cable modem interface.

Finally, in a wireless LAN embodiment, expansion module 321 may comprise a wireless transceiver interface that communicates with PC 234 via antenna 295. In the illustrated embodiment, antenna 295 is an integral component of subscriber IAD 210 that is coupled to a connection pin on mezzanine IF 320. In such an embodiment, expansion module 321 comprises conventional RF transceiver circuitry, but does not require its own antenna. However, in an alternate embodiment, antenna 295 may be an integral component of expansion module 321, such that subscriber IAD 210 does not contain a separate antenna for wireless LAN purposes.

Figure 4:
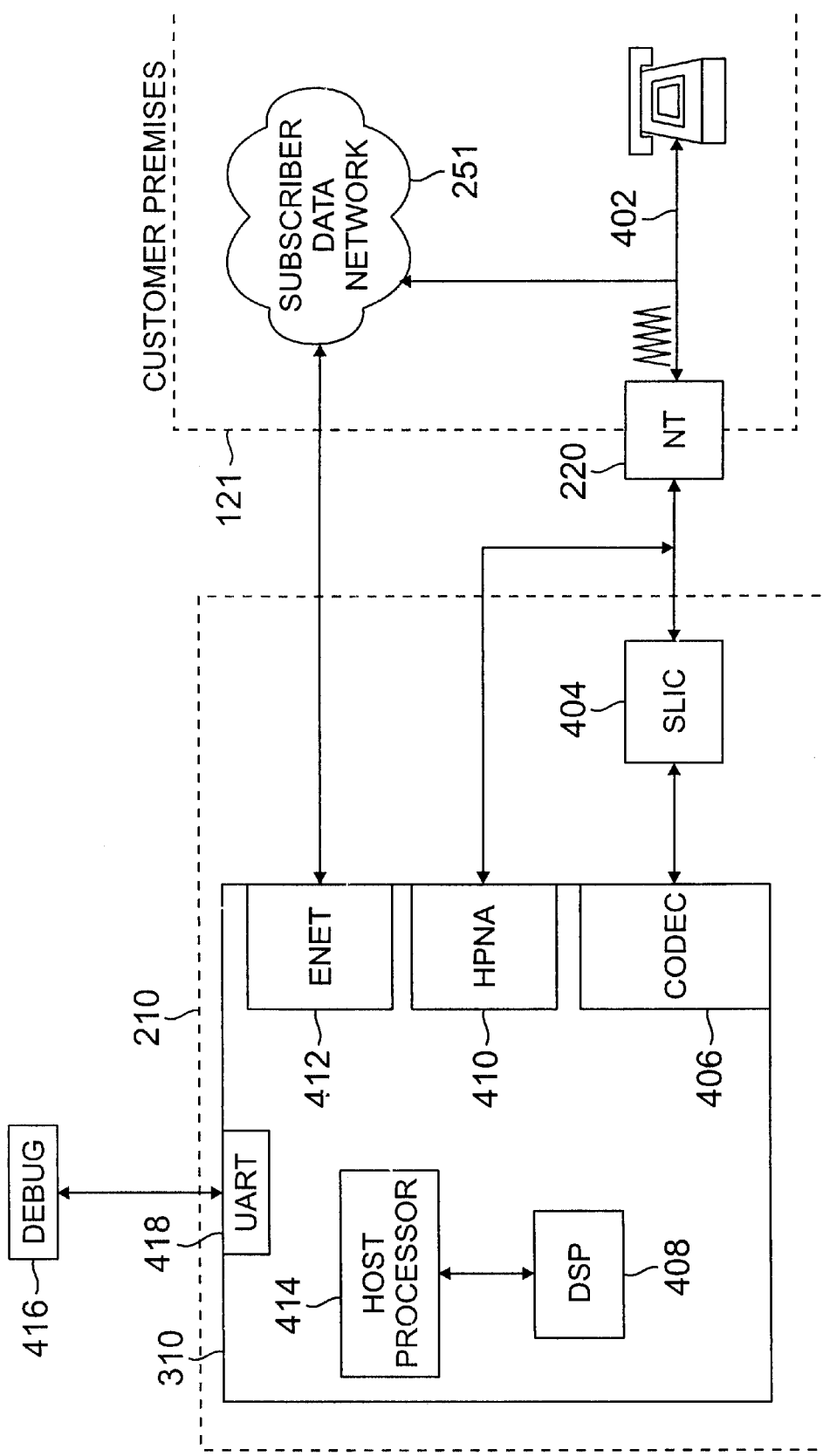
FIG. 4 depicts signal flow in the subscriber interface access device in an embodiment of the present invention.

FIG. 4 depicts signal flow in the subscriber interface access device in a wireless network in an embodiment of the present invention. As discussed in FIG. 3, subscriber IAD 210 is capable of handling a minimum of two standard voice frequency lines and a high-speed data line. Addition of a mezzanine interface (not shown) provides additional capability for supporting two additional VF lines and/or a T1/E1 interface. As shown in FIG. 4, data and voice signals may be passed from the subscriber system (not shown) through VF line 402, through NT 220 demarcation point to subscriber line interface circuit (SLIC) 404. SLIC 404 provides all required line conditioning, line balancing and ringing voltages. SLIC 404 is fully programmable so as to be compliant with both current and future, domestic and international standards. SLIC 404 interfaces with coder/decoder (CODEC) 406 which converts analog voice signals from telephone 242 to a digital pulse code modulated (PCM) signal. The PCM signal is then processed, in this embodiment, by Micro-controller/Compression Digital Signal Processor (DSP) 408, for further voice compression.

HPNA interface 410 and Ethernet interface 412 are capable of 10 Base-T, 100 Base-T, 1000 Base-T and/or Home Phone Networking Alliance (HPNA 1.0) throughput. Subscriber data network 251 may be connected directly to data interface 412 for bi-directional flow between subscriber data network 251 and external networks (not shown) via Subscriber IAD 210. Data interface 410 is connected to an Ethernet PHY (physical layer) and MAC (Medium Access Control) interface and further to micro-controller 414 for processing voice and packet data. Voice and packet data are passed to DSP 408 for scheduling and then delivered to an air interface (not shown) for transmission to an air interface on a base transceiver station in the wireless network. HPNA data interface 410 provides connection to the subscriber premises system utilizing HPNA protocol that operates in a similar manner to Ethernet but the physical layer is an overlay of the VF pair so as to take advantage of the existing wiring in the subscriber premises.

Telemetry and control information from DC battery 261 is received over a signal/ground twisted pair that is connected, along with the DC power leads, to subscriber IAD 210 main unit. Telemetry interface 416 is connected to a Universal Asynchronous Receiver/Transmitter (UART) 418 on the subscriber IAD. The battery pack (DC battery 261) is periodically polled for temperature and voltage information generated by temperature and voltage measuring devices. Two controllable switches (not shown) are provided for controlling charger and heater functions.

Figure 5A:
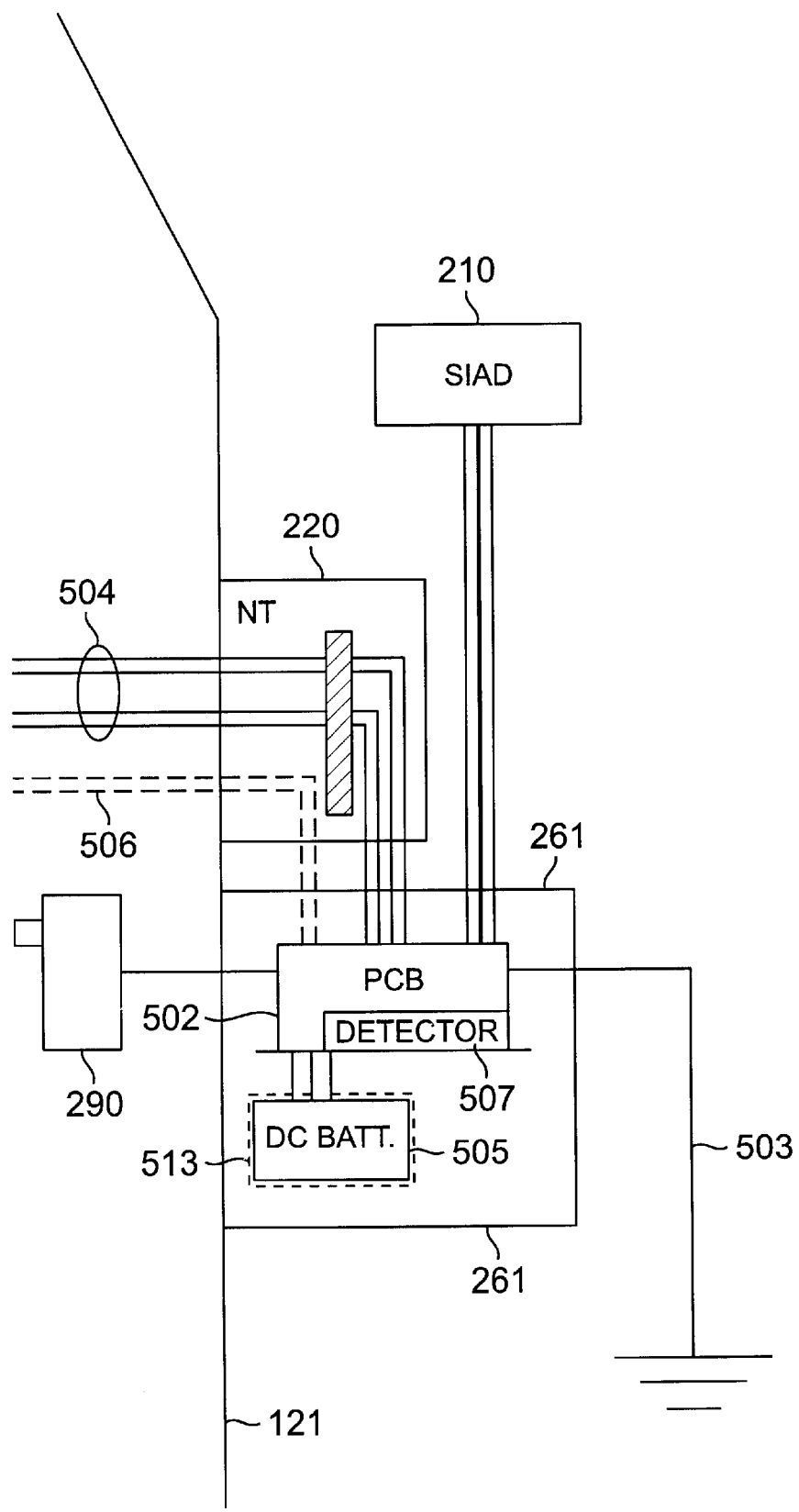
FIG. 5 illustrates a high-level block diagram of one embodiment of the present invention.
Figure 6A:
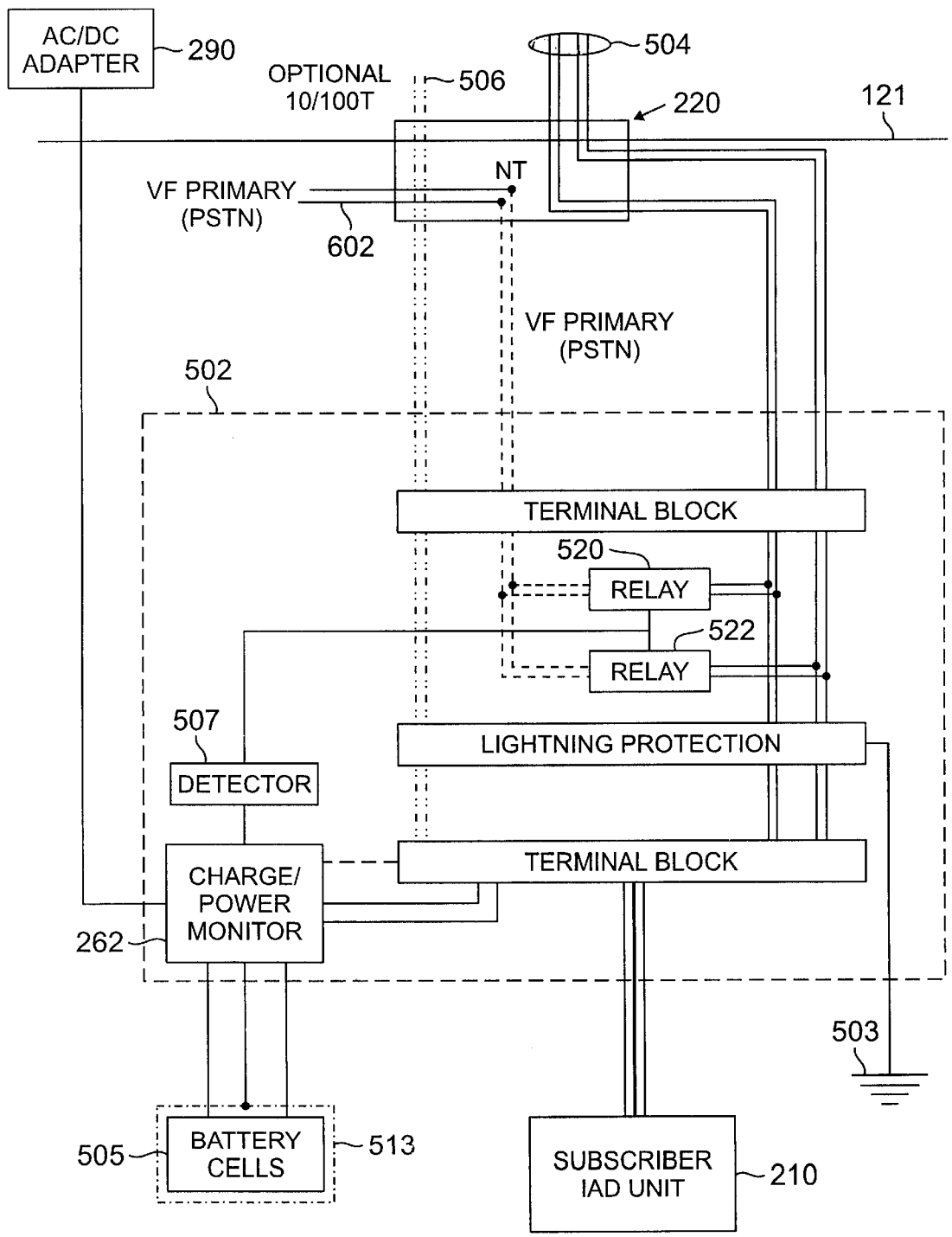
FIGS. 6A–6C illustrate the fail-over printed circuit board according to several embodiments of the present invention.
Figure 6B:
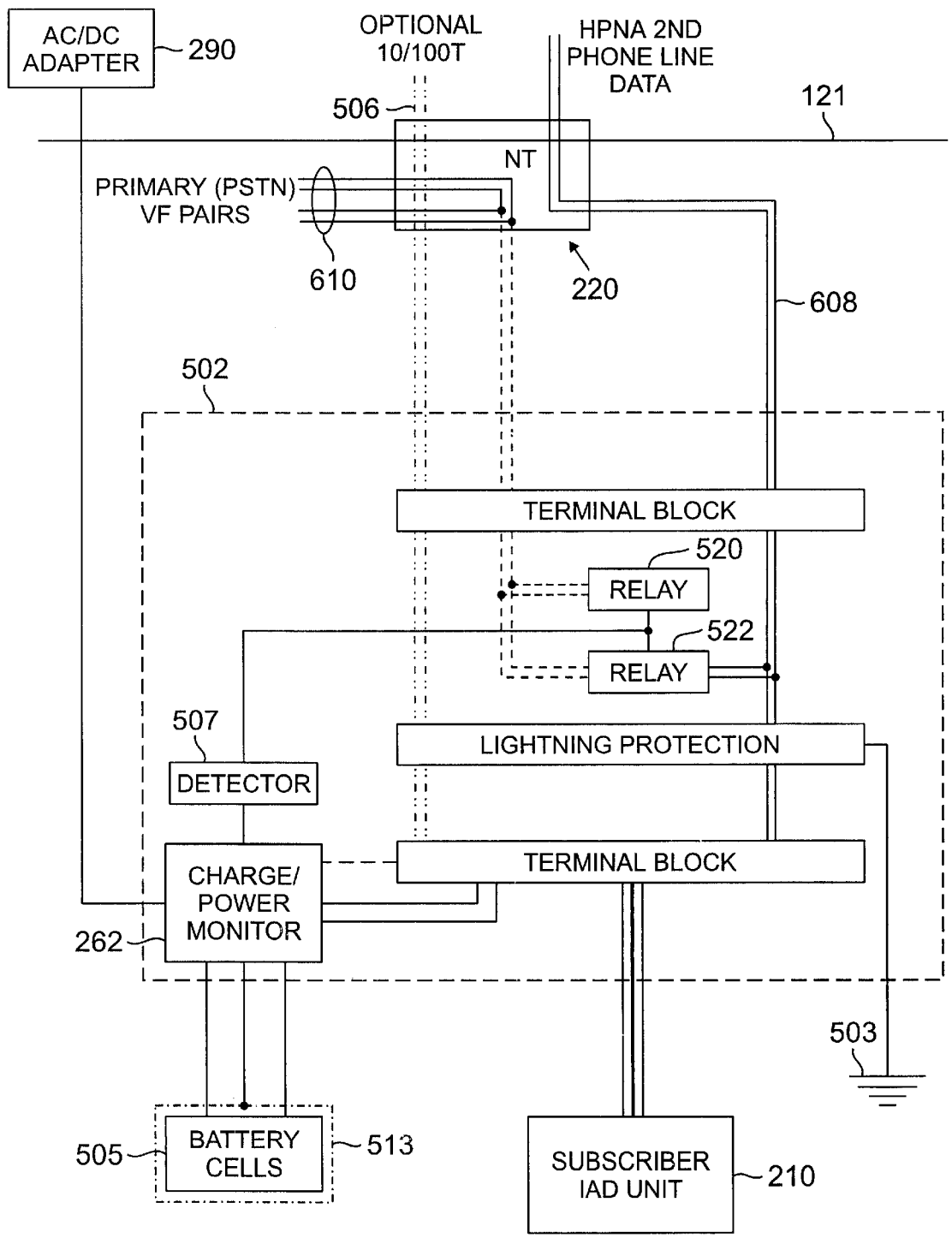
Figure 6C:
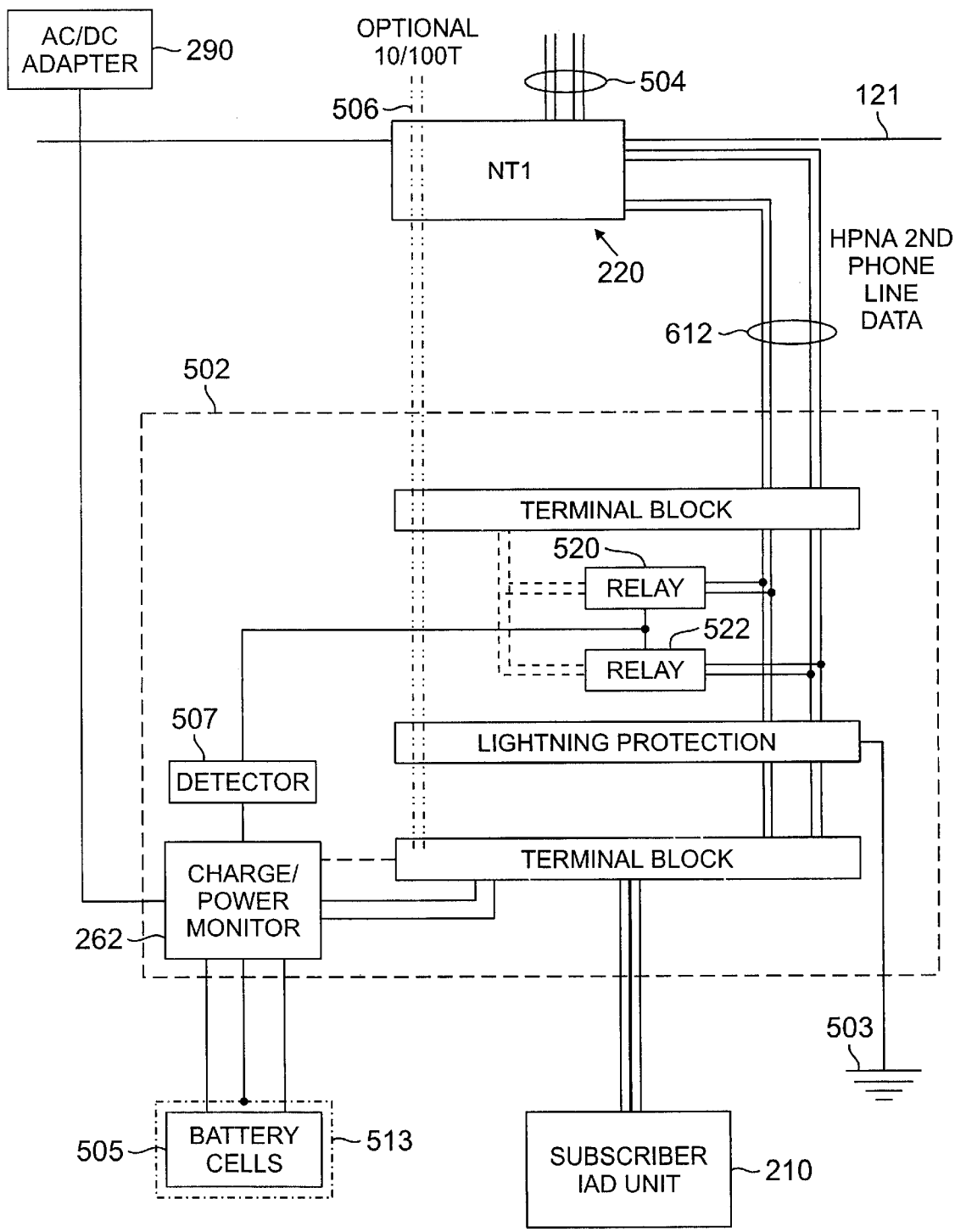

FIG. 5A illustrates a high-level block diagram of a fail-over PCB according to an embodiment of the present invention. Subscriber IAD 210, in this illustration, is shown providing VF services 504 and data service 506 via fail-over PCB 502 that, in this illustration, is housed in DC battery 261. In this illustration the VF services are provided by subscriber IAD 210. As discussed previously and as may be seen in FIGS. 6A and 6B, a typical installation will include at least one VF service connected to the PSTN. Three configurations of fail-over PCB 502 connections are illustrated in FIGS. 6A–6C. As discussed in FIG. 2, the demarcation between an external communications network and subscriber premises wiring is NT 220. Any termination of subscriber interfaces to subscriber IAD 210, including VF primary, is made at NT 220. Prior to NT 220, however, lightning protection 503 (e.g., as shown here, earth ground) must be provided to protect signal connections in subscriber premises 121. Additionally, a subscriber that is including broadband service in the subscription requires primary DC power provided from optional backup DC battery 261 and AC/DC adapter 290.

Figure 5B:
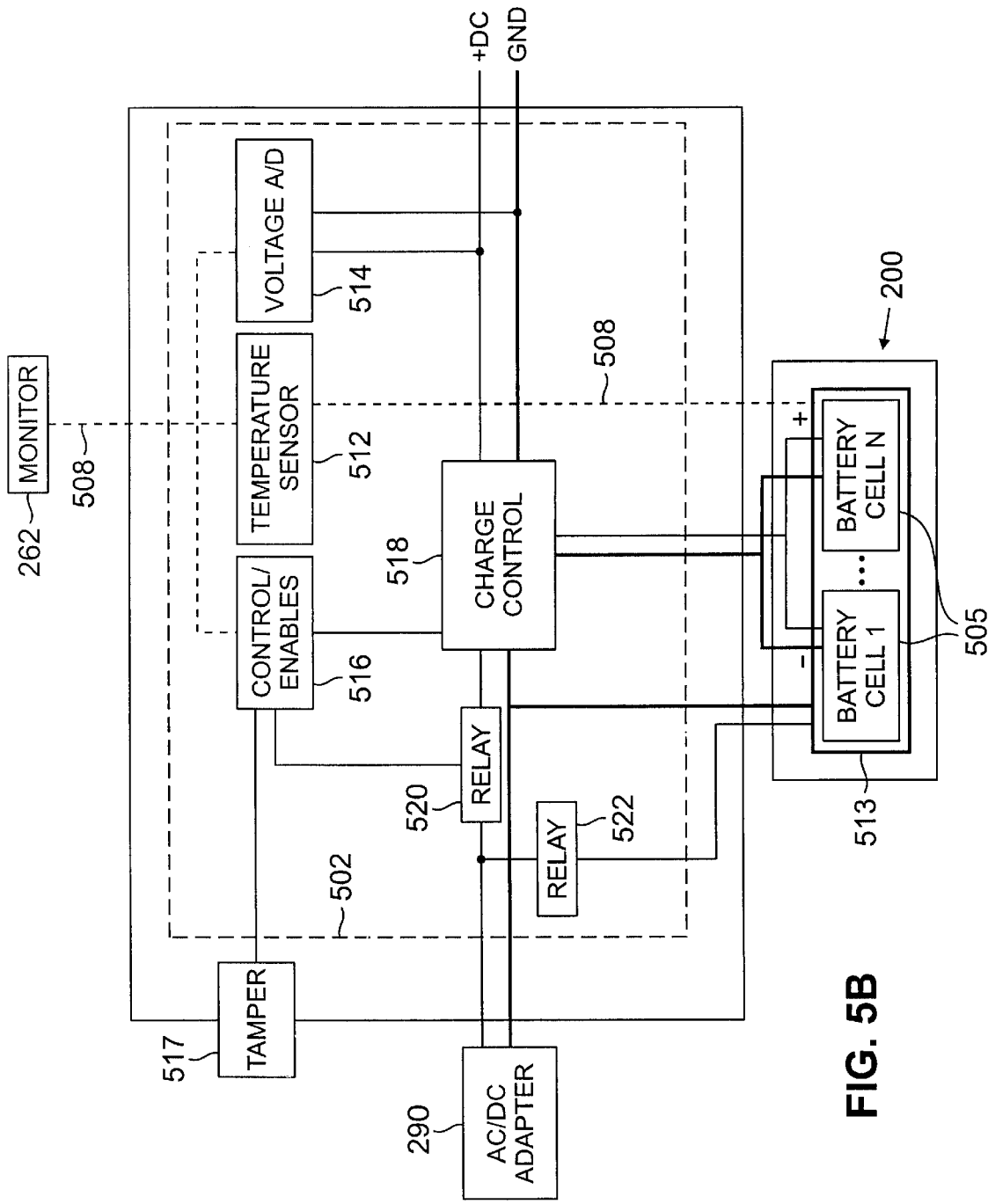

Additional features of the present invention related to power requirements associated with subscriber IAD 210 include:

1) temperature measurement to prevent charging above a specific temperature;
2) voltage measurement for estimating battery life;
3) battery charger switching circuit for charging DC battery cells 505;
4) an optional cold weather battery heater switch (it is well known that battery efficiency decreases with very low temperatures) with heater and insulator 513;
5) intrusion detection to indicate battery box is open; and
6) a battery load test circuit for measuring battery charge and output decay (see FIG. 5B for a detailed description of the features).

Subscribers with an existing phone line connected directly to the PSTN (not depicted here) have an option to retain the PSTN service (a wireline service) to backup the wireless system of the present invention. The broadband service of the present invention may also be utilized by the subscriber to provide secondary voice lines and/or data service with or without a backup battery. To insure that all subscriber premises telephones can operate in the event of a power failure, including failure of the backup battery, a set of relays whose contacts close to make a connection on a loss of power is provided on all secondary lines. If all power at the subscriber premises 121 fails, detector circuit 507 detects the power failure, triggers the fail-over relays and all secondary phone lines in the broadband subscriber connection will fail-over to the primary voice line (not shown) connected to the PSTN (not shown). Since the PSTN network is usually operational, there will be a live connection to the primary voice line for the subscriber premises 121 via the fail-over relays.

FIG. 5B illustrates a high-level block diagram of a circuit for monitoring and maintaining DC battery 261 according to an embodiment of the present invention. As depicted, DC battery 261 comprises: temperature sensor 512 for monitoring the temperature of battery cells 505, voltage sensor 514 for monitoring the voltage of battery cells 505, battery heater and insulator 513 for maintaining optimum temperature of battery cells 505, control switch 516 for maintaining power to fail over relays 520 and 522, charge control switch 518 for switching charging and heating functions on or off, tamper switch 517 for sending an alarm when the DC battery 261 case is opened and relay 520 and relay 522 for connecting secondary voice lines to a primary voice line connected to the PSTN.

Temperature sensor 512 monitors battery cell 505 temperatures to regulate charging instances. As is well known in the art, a battery's life cycle may be reduced if charging takes place above a certain temperature. Typically, the range of acceptable temperatures is from 0 degrees to 40 degrees centigrade so, the present invention monitors voltage and temperature of battery cells 505. Battery cells 505 voltage is monitored by voltage sensor 514 as an indicator of its charge state. Battery heater and insulator 513 is enabled during low temperatures to maintain an optimum operating and charging temperature for battery cells 505. Signals from temperature sensor 512 and voltage sensor 514 are sent to subscriber IAD 210 via telemetry/control line 508. The temperature and voltage measurements are monitored and depending on the requirements of the battery cells 505, AC/DC adapter 290 and heater 513 may be switched on or off via charge control switch 518.

FIGS. 6A–6C illustrate the fail-over printed circuit board according to several embodiments of the present invention. FIG. 6A depicts a configuration of fail-over PCB 502 with fail-over relays 520 and 522 interconnected to two secondary VF services 504 (provided as part of the broadband connection), VF primary service 602 and detector circuit 507. VF primary service 602 is the PSTN connection that does not require back up power. Lightning protection is provided to the secondary VF services 504, data services 506 and VF primary service 602 via earth ground 503. Detector circuit 507 monitors and detects power failures of both AC/DC adapter 290 and battery cells 505. If a power failure occurs then detector circuit 507 triggers fail-over relays 520 and 522, connecting the subscriber premises communication system to the PSTN via VF primary service 602. Power monitor 262 monitors and initiates charging, or substitutes battery cells 505 for AC/DC adapter 290 to subscriber premises 121 when necessary.

FIG. 6B depicts a configuration of fail-over PCB 502 with fail-over relays 520 and 522 interconnected to a single HPNA phone and data line 608 and VF primary service 610 which includes two primary PSTN VF pairs. VF primary service 610 provides two direct PSTN (wireline) connections that do not require back up power. Lightning protection is provided to secondary HPNA service 608, data service 506 and VF primary service 610 via earth ground 503. Detector circuit 507 monitors and detects power failure in AC/DC adapter 290 and then triggers fail-over relay 522 connecting the subscriber premises communication system to the PSTN. Power monitor 262 monitors and initiates charging, or substitutes battery cells 505 for AC/DC adapter 290 to subscriber premises 121 when necessary.

FIG. 6C depicts a configuration of fail-over PCB 502 with fail-over relays 520 and 522 disabled and not connected to any backup PSTN service. This configuration illustrates complete bypass of PSTN/ILEC (incumbent local exchange carrier) utilizing only the wireless connection provided by subscriber IAD 210. There is no backup utilizing a PSTN connection. Voice and data service are provided to subscriber premises 121 via HPNA voice and data services 612. Lightning protection is provided to HPNA, VF and data services 612, data services 506 and NT 220 via earth ground 503. Detector circuit 507, in this configuration is not connected. Power monitor 262 monitors and initiates charging, or substitutes battery cells 505 for AC/DC adapter 290 to subscriber premises 121 when necessary.

Figure 7A:
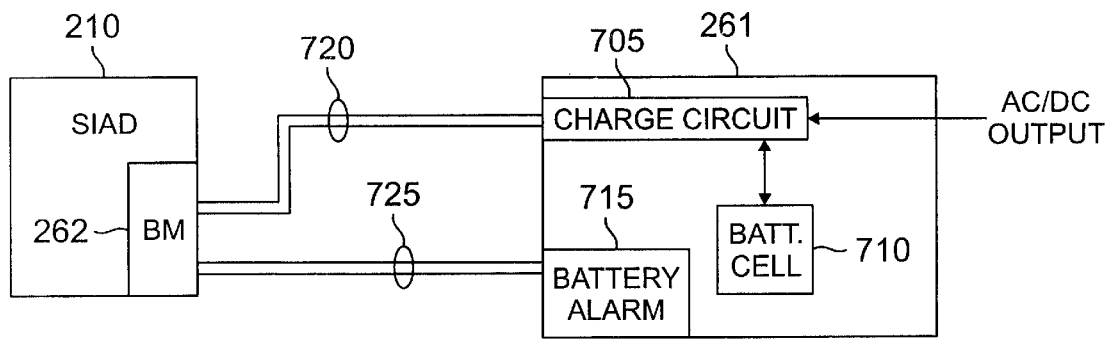
FIGS. 7A–7C illustrates a DC battery with subscriber integrated access device in greater detail according to several embodiments of the present invention.
Figure 7B:
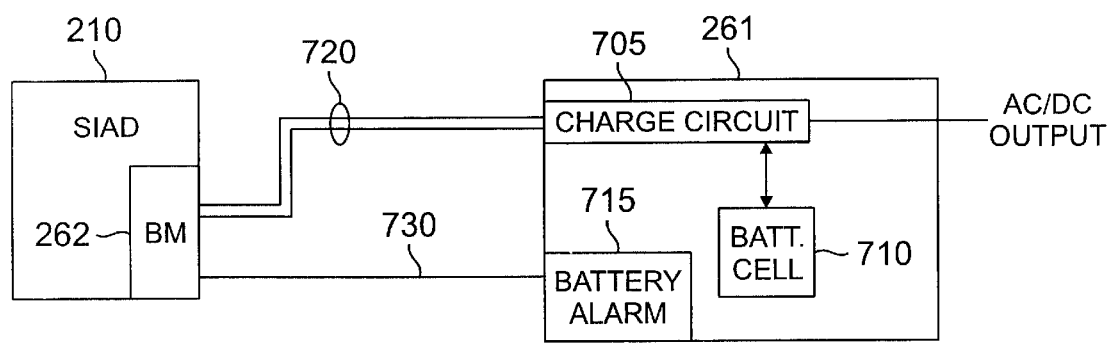
Figure 7C:
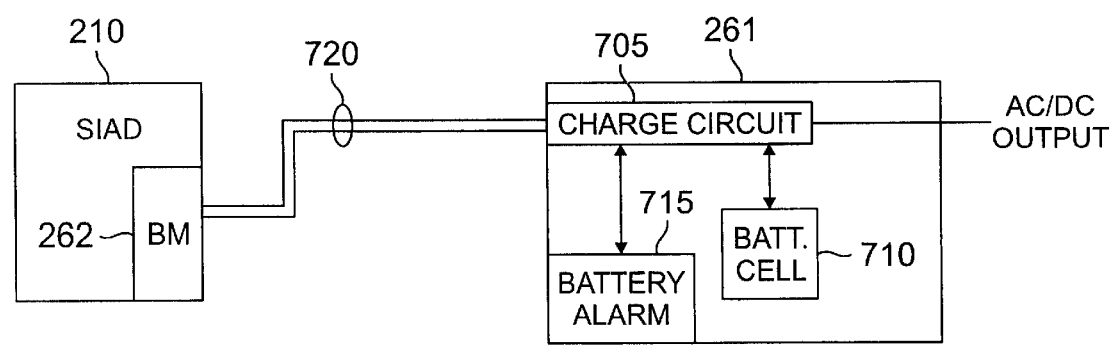

FIGS. 7A–7C illustrates DC battery 261 and subscriber IAD 210 in greater detail according to several embodiments of the present invention. In FIG. 7A, DC battery 261 comprises charge circuit 705, battery cell 505, and battery alarm detector 715. Charge circuit 705 receives the output of AC/DC adapter 290 and applies a charge to battery cell 505. The DC power is then sent to subscriber IAD 210 via power/ground pair 720. Battery alarm detector 715 detects the opening of DC battery 261 and transmits an alarm signal to subscriber IAD 210 via signal line pair 725 (i.e., data line and clock line).

FIG. 7B depicts an alternate embodiment for transmitting alarm signals to subscriber IAD 210. DC battery 261 is similar in most respects except that alarm signals are transmitted to subscriber IAD 210 via serial data line 730. FIG. 7C depicts yet another embodiment for transmitting alarm signals to subscriber IAD 210. DC battery 261 is similar in most respects except that battery alarm detector 715 transmits alarm signals to charge circuit 705. Charge circuit 705 then transmits an alarm signal (e.g., a pulse signal) to subscriber IAD 210 on power/ground pair 720 along with the DC power. Charge circuit 705 may use one type of alarm signal to indicate that main AC power has failed and another type of alarm signal to indicate that DC battery 261 has been tampered with.

Figure 8:
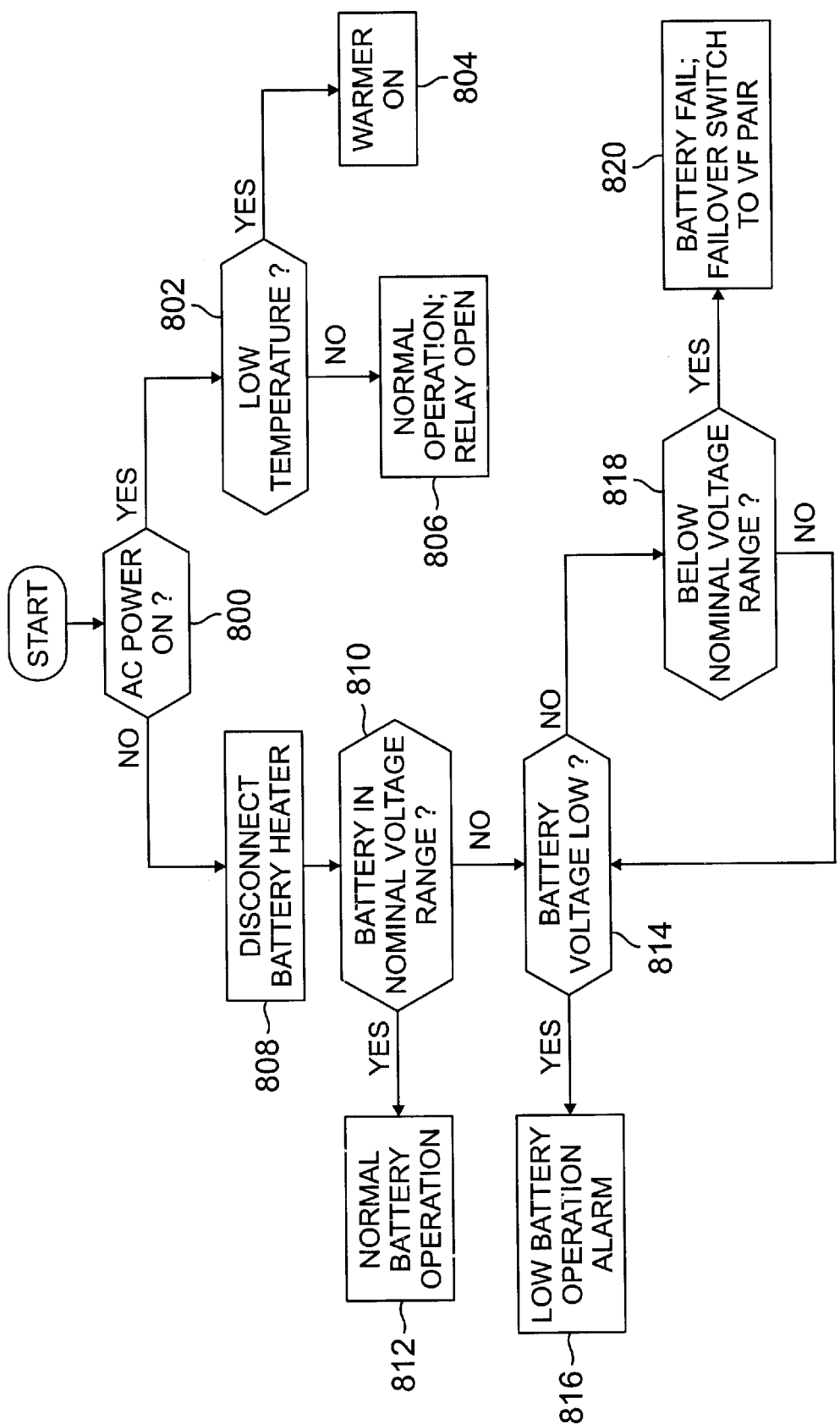
FIG. 8 illustrates a high-level flow diagram of an exemplary method for interconnecting a plurality of communications mediums at a subscriber's premises in accordance with the principles of the present invention.

FIG. 8 illustrates a high-level flow diagram of an exemplary method for interconnecting a plurality of communications mediums at a subscriber's premises in accordance with the principles of the present invention. For purposes of illustration, concurrent reference may be made to FIGS. 3, 4 and 5.

As discussed above, subscriber IAD 210 may connect to wireless and other broadband services as well as the public service telephone network. A backup power supply is required for subscriber IAD 210 for connection to a wireless network in case power to subscriber premises 121 fails. Subscriber IAD 210 utilizes battery monitor 262 to check AC/DC adapter 290 and battery cells 505 for a voltage level that is within a nominal operating range. A determination is made by the subscriber IAD 210 of whether AC/DC adapter 290 is powered on (process step 800). DC power is provided to subscriber 210 by AD/DC adapter 290 unless AC power fails. AC power failure causes DC battery 261 to switch in.

If AC/DC adapter 290 is operational and AC power is on, the temperature of battery cells 505 is measured to determine if the temperature is too low (process step 802). If the temperature is too low, battery heater and insulator 513 is turned on to raise the temperature of the battery to a temperature within an optimum operating range (process step 804). If, instead, the temperature is within that optimum range (usually 0 degrees to 40 degrees centigrade), the operation of the power system is normal and AC/DC adapter 290 provides power to subscriber IAD 210 (process step 806).

If AC/DC adapter 290 is not on, battery heater and insulator 513 is switched off to prevent overheating the battery. Depending on the location and time of year, 513 heater and insulator may have already been switched off to stay in the nominal voltage range (process step 808). The nominal voltage range of battery cells 505 is monitored by voltage sensor 514 (process step 810). If battery cells 505 voltage range is within the nominal range of normal operation and DC battery 261 is operating properly normal operation, in backup mode, continues (process step 812). A check is then made of whether battery cells 505 voltage is low (process step 814). If voltage conditions on battery cells 505 near the low end of the nominal voltage range are detected, an alarm is transmitted to fixed wireless access network 100 through subscriber IAD 210 (process step 816). Signals are then transmitted to the charge controller to initiate charging for battery cells 505.

If the determination is made that the voltage of battery cells 505 is not below the nominal operating voltage range, the process continues to monitor the voltage state of battery 505 (process step 818). If the voltage of battery 505 drops below the low end of the nominal voltage range, battery 505 is considered failed and control switch 516 removes power (if any) from failover relays 520 and 522. Fail-over relays 520 and 522 then connect secondary voice frequency pairs 504 to a primary voice frequency pair (not shown) and thus to the PSTN (process step 820. Further if there is a complete failure of both AC/DC adapter 290 and battery cells 505, failover relays 520 and 522 automatically connect secondary voice frequency pairs 504 to the primary voice frequency pair.

Although the present invention has been described in detail, those skilled in the art should understand that they can make various changes, substitutions and alterations herein without departing from the spirit and scope of the invention in its broadest form.

What is claimed is:

1. For use in association with a subscriber premises, an apparatus for interconnecting a plurality of communications mediums, comprising:

a controller for coupling and de-coupling said plurality of communications mediums to a communication system disposed within said subscriber premises, wherein said communications mediums comprise at least one public service telephone network line and at least one non-public service telephone network line;

a detector circuit for detecting a loss of power to said at least one non-public service telephone line and in response to said loss of power, utilizing at least one relay device to connect said non-public service telephone line to said at least one public service telephone network line; and a backup power supply comprising:
 a controller for operating said backup power supply, controlling said backup power supply temperature and enabling an AC/DC adapter to charge said backup power supply;
 a temperature sensing circuit for monitoring said backup power supply operating temperature; and
 a voltage measuring circuit for monitoring said backup power supply voltage.

2. The interconnect apparatus as set forth in claim 1 further comprising interconnection with a radio frequency transceiver for transmitting and receiving wireless communications from a wireless network.

3. The interconnect apparatus as set forth in claim 2 wherein said wireless network is a fixed wireless network.

4. The interconnect apparatus as set forth in claim 1 further comprising a broadband interface for transmitting and receiving broadband data communications including cable modem, digital subscriber line, fiber optic and wireless broadband.

5. The interconnect apparatus as set forth in claim 1 further comprising a switch for connecting said non-public service telephone network with said public service telephone network.

6. The interconnect apparatus as set forth in claim 5 further comprising a telemetry/control circuit for remotely monitoring and controlling said backup battery power supply.

7. The interconnect apparatus as set forth in claim 1 further comprising an interface for receiving said at least one standard voice frequency communication line that is connected to the public service telephone network and said at least one non-public service telephone network communication line.

8. For use in association with a wireless network, an apparatus comprising:

an access processor for interconnecting said wireless network with said public service telephone network;

a plurality of remote base transceiver stations connected to said access processor via remote modems wherein said remote modems communicate via an air interface with multiple individual subscriber interface access devices associated with respective subscriber premises; and an apparatus for interconnecting a plurality of communications mediums at said subscriber premises, comprising:
 a controller for coupling and de-coupling said plurality of communications mediums to a communication system disposed within said subscriber premises, wherein said communications mediums comprise at least one public service telephone network line and at least one non-public service telephone network line;

a detector circuit for detecting a loss of power to said at least one non-public service telephone line and in response to said loss of power, utilizing at least one relay device for connecting said non-public service telephone line to said at least one public service telephone network line; and a backup power supply comprising:
  a controller for operating a said backup power supply, controlling said backup power supply temperature and enabling an AC/DC adapter to charge said backup power supply;
  a temperature sensing circuit for monitoring said backup power supply operating temperature; and
  a voltage measuring circuit for monitoring said backup power supply voltage.

9. The apparatus as set forth in claim 8 wherein said wireless network is a fixed wireless network.

10. The apparatus as set forth in claim 8 further comprising interconnection with a radio frequency transceiver for transmitting and receiving wireless communications from a wireless network.

11. The apparatus as set forth in claim 8 further comprising a broadband interface for transmitting and receiving broadband data communications including cable modem, digital subscriber line, fiber optic and wireless broadband.

12. The apparatus as set forth in claim 8 further comprising a switch for connecting said non-public service telephone network with said public service telephone network.

13. The apparatus as set forth in claim 8 further comprising a telemetry/control circuit for remotely monitoring and controlling said backup power supply.

14. The apparatus as set forth in claim 8 further comprising an interface for receiving at least one standard voice frequency communication line that is connected to the public service telephone network and at least one said non-public service telephone network communication line.

15. For use in a fixed wireless network, a method for interconnecting a plurality of communications mediums at a subscriber's premises, comprising the steps of:
  coupling and de-coupling said plurality of communications mediums, to a communication system disposed within said subscriber premises, wherein said communications mediums comprise at least one public service telephone network line and at least one non-public service telephone network line;

detecting a loss of power to said at least one non-public service telephone line and in response to said loss of power, switching said non-public service telephone line to said at least one public service telephone network line; and utilizing a backup power supply connected to an AC/DC adapter, comprising:
    a controller for operating said DC battery power supply, controlling said backup power supply temperature and enabling an AC/DC adapter to charge said backup power supply;
    a temperature sensing circuit for monitoring said backup power supply operating temperature; and
    a voltage measuring circuit for monitoring said backup power supply voltage.

16. The method as set forth in claim 15 further comprising transmitting and receiving wireless communications from a wireless network.

17. The method as set forth in claim 15 further comprising the steps of transmitting and receiving broadband data communications including cable modem, digital subscriber line, fiber optic and wireless broadband via a broadband interface interconnected with said controller.

18. The method as set forth in claim 1 further comprising the step of
  connecting said non-public service telephone network with said public service telephone network; and
  remotely monitoring and controlling said backup power supply.

19. The method as set forth in claim 1 further comprising the step of providing a fail-over connection between said at least one primary public service telephone network line and all said non-public service telephone network lines utilizing at least one relay device.

20. The method as set forth in claim 1 further comprising connecting at least one standard voice frequency communication and at least one non-public service telephone network line to an interface that is connected to said subscriber premises.

* * * * *

UNITED STATES PATENT AND TRADEMARK OFFICE
CERTIFICATE OF CORRECTION

PATENT NO.        : 6,564,051 B2
APPLICATION NO. : 09/838910
DATED             : May 13, 2003
INVENTOR(S)       : Paul F. Struhsaker, Rex N. Frodge and Barry W. Barge It is certified that error appears in the above-identified patent and that said Letters Patent is hereby corrected as shown below:

On the first page of the patent please delete the Assignee "Raze Technoliges, Inc." and replace with -- Raze Technologies, Inc.--.

In the drawings:

Please replace Fig. 1 with the following:

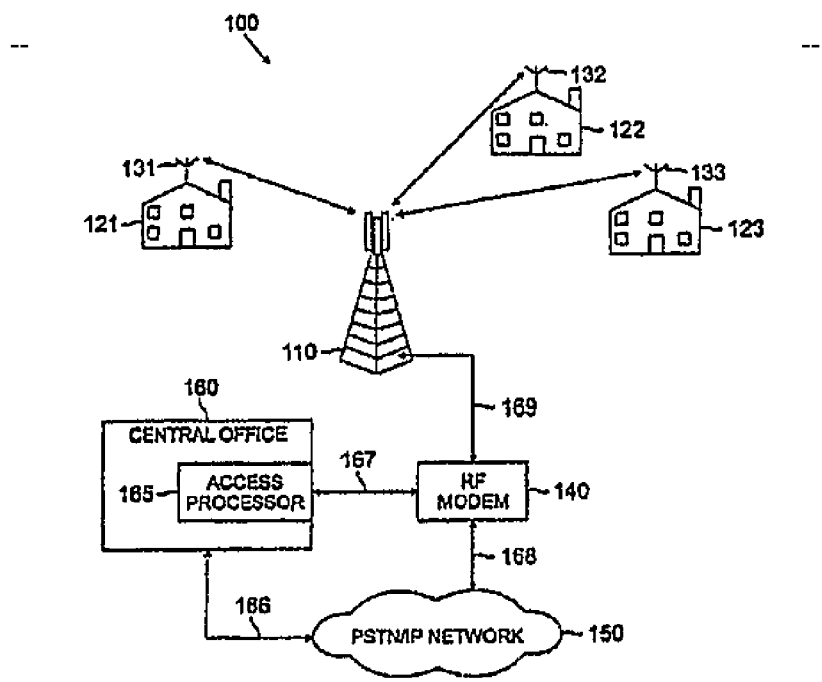

FIG. 1

UNITED STATES PATENT AND TRADEMARK OFFICE
CERTIFICATE OF CORRECTION

| | | |
|---|---|---|
| PATENT NO. | : 6,564,051 B2 | Page 2 of 4 |
| APPLICATION NO. | : 09/838910 | |
| DATED | : May 13, 2003 | |
| INVENTOR(S) | : Paul F. Struhsaker, Rex N. Frodge and Barry W. Barge | |

It is certified that error appears in the above-identified patent and that said Letters Patent is hereby corrected as shown below:

Please replace Fig. 3 with the following:

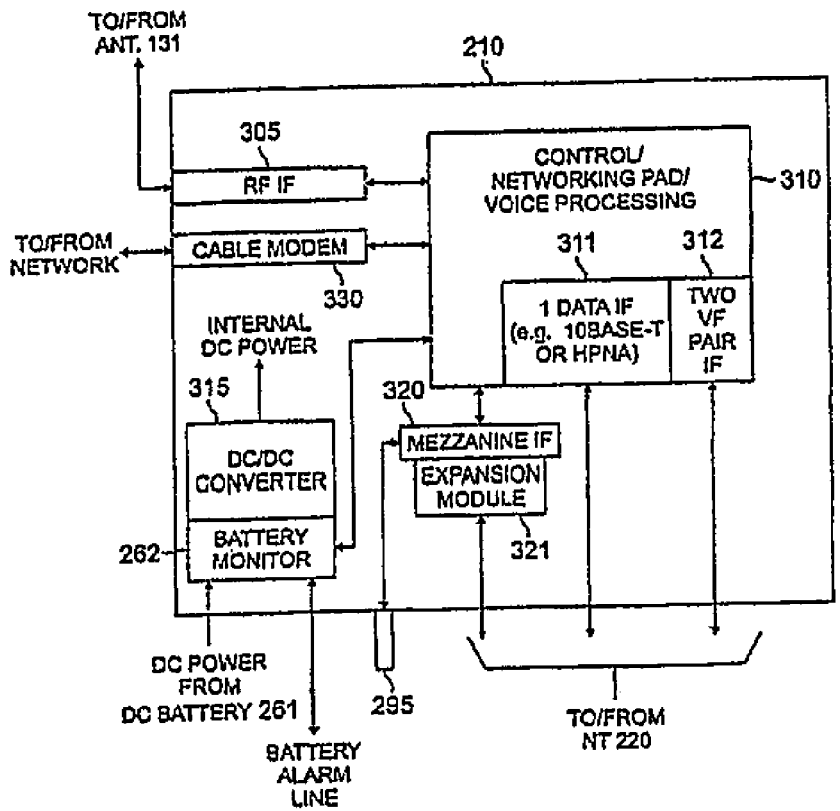

FIG. 3

UNITED STATES PATENT AND TRADEMARK OFFICE
CERTIFICATE OF CORRECTION

PATENT NO.        : 6,564,051 B2
APPLICATION NO.   : 09/838910
DATED             : May 13, 2003
INVENTOR(S)       : Paul F. Struhsaker, Rex N. Frodge and Barry W. Barge It is certified that error appears in the above-identified patent and that said Letters Patent is hereby corrected as shown below:

Please replace Fig. 4 with the following:

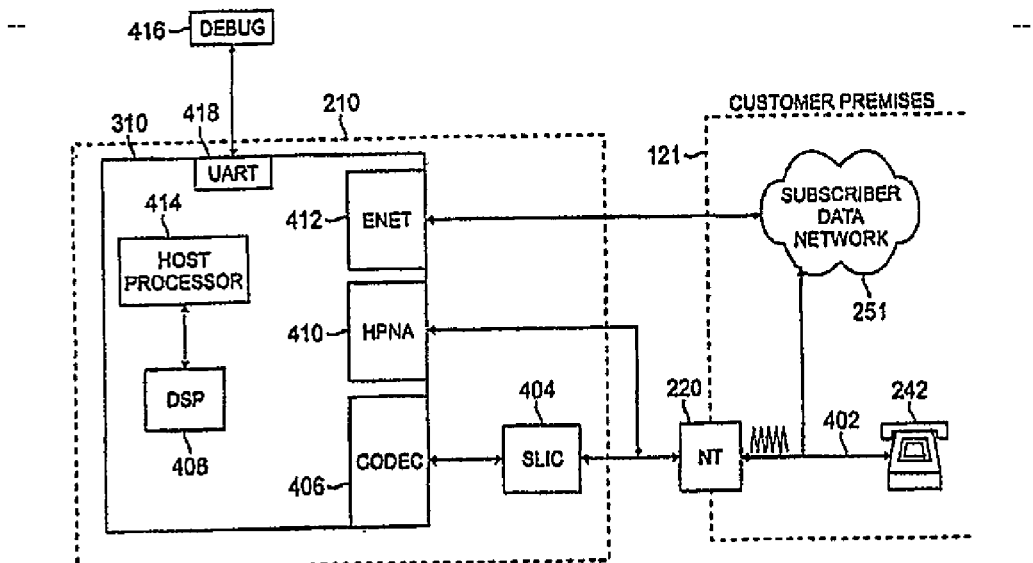

FIG. 4

UNITED STATES PATENT AND TRADEMARK OFFICE
CERTIFICATE OF CORRECTION

| | | |
|---|---|---|
| PATENT NO. | : 6,564,051 B2 | Page 4 of 4 |
| APPLICATION NO. | : 09/838910 | |
| DATED | : May 13, 2003 | |
| INVENTOR(S) | : Paul F. Struhsaker, Rex N. Frodge and Barry W. Barge | |

It is certified that error appears in the above-identified patent and that said Letters Patent is hereby corrected as shown below:

Please replace Fig. 5B with the following:

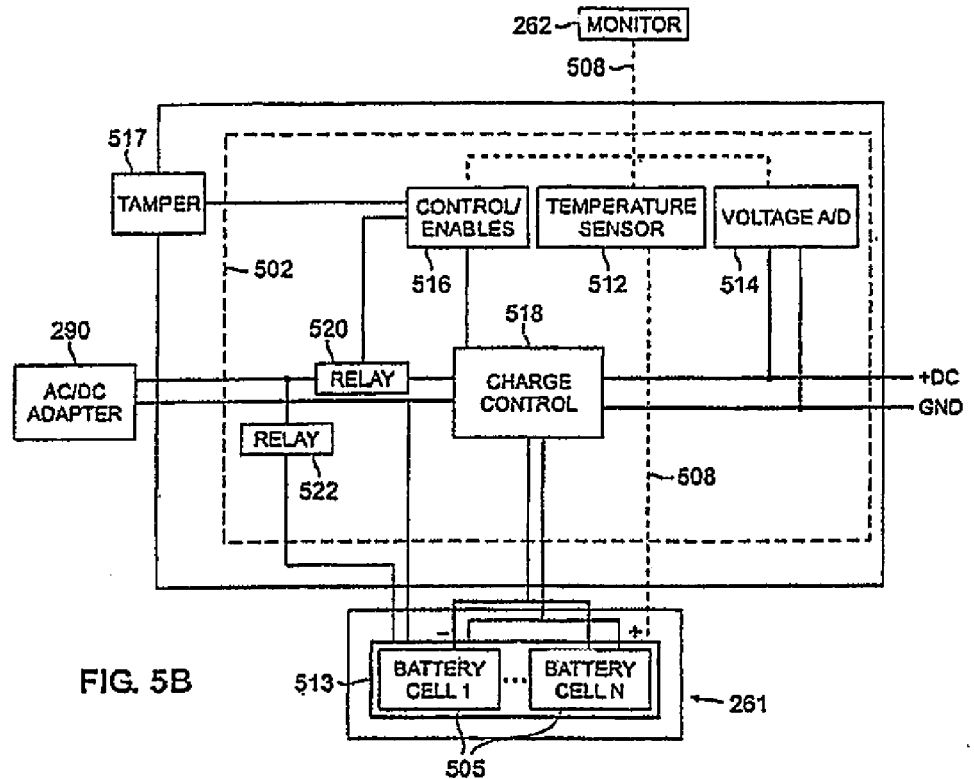

Signed and Sealed this

Sixth Day of November, 2007

JON W. DUDAS
*Director of the United States Patent and Trademark Office*